Sept. 2, 1941.    W. D. TURNER    2,254,670
BEARING
Filed Aug. 14, 1939    2 Sheets-Sheet 1
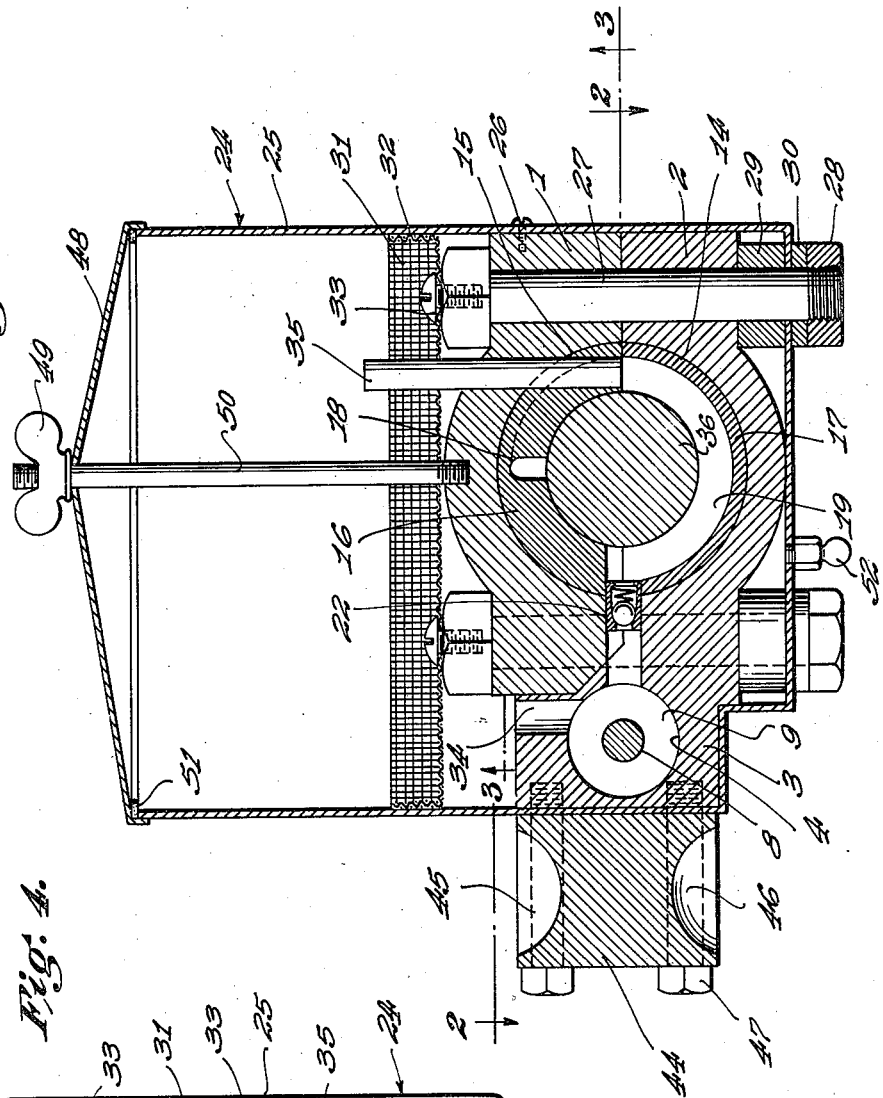
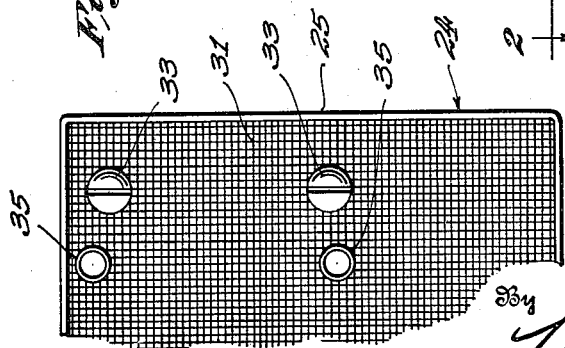
Inventor
W. D. TURNER
By Lacey & Lacey, Attorneys Sept. 2, 1941.   W. D. TURNER   2,254,670
BEARING
Filed Aug. 14, 1939   2 Sheets-Sheet 2
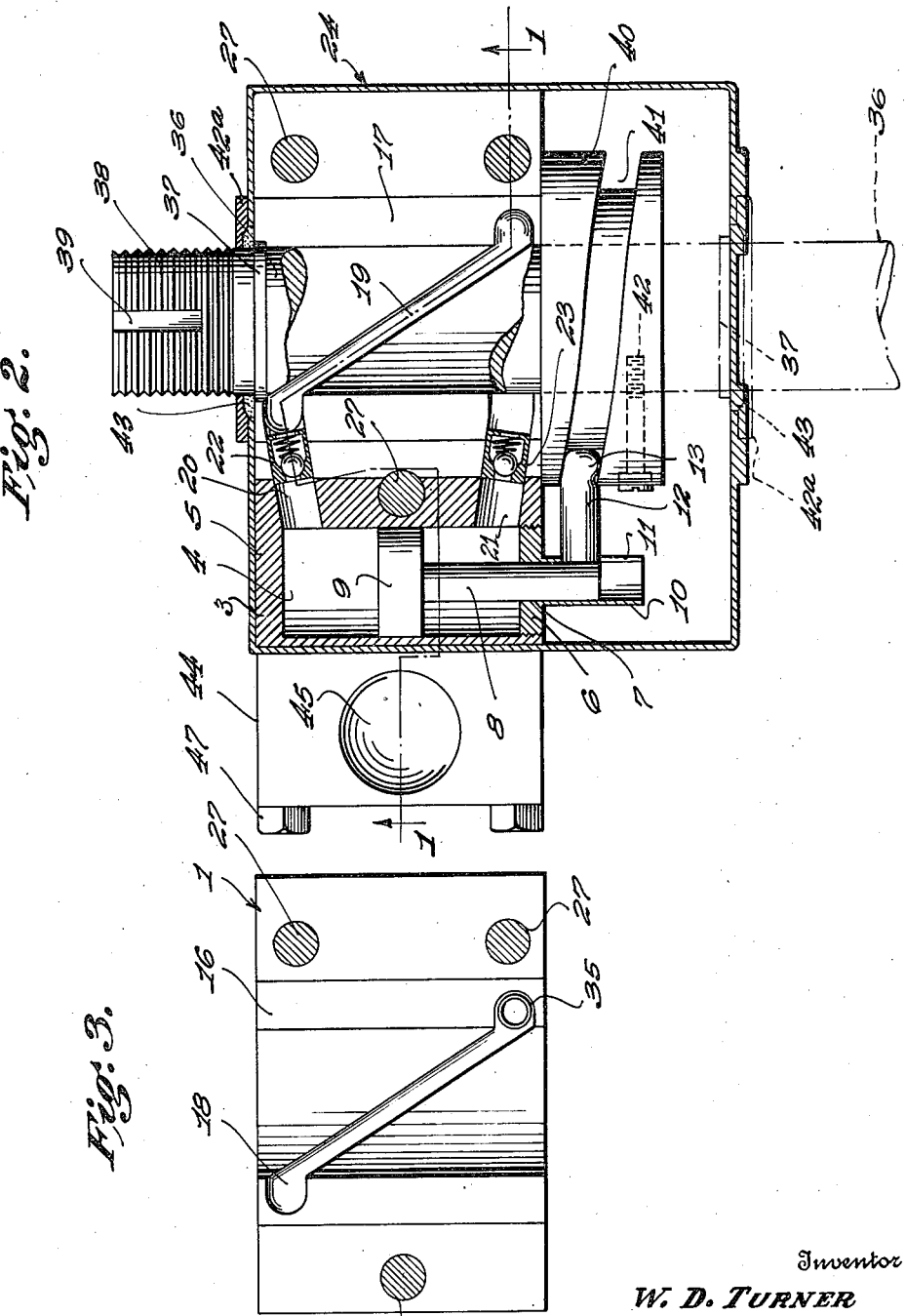
Inventor
W. D. TURNER
By Lacey & Lacey, Attorneys Patented Sept. 2, 1941

2,254,670

UNITED STATES PATENT OFFICE 2,254,670

BEARING

William D. Turner, Salem, Oreg.

Application August 14, 1939, Serial No. 290,013

9 Claims. (Cl. 308—122)

This invention relates to an improved bearing which is particularly adapted for use with mowing machines and other heavy machinery.

One of the principal objects of the invention is to provide a bearing having force feed lubrication means which will insure proper lubrication of a shaft rotating in the bearing at all times.

Another object of the invention is to provide a device of this character, the force feed lubrication means of which is so arranged that lubricant will be forced about the shaft every third revolution thereof.

A further object of the invention is to provide a bearing wherein the force feed lubrication means employed includes a double acting cylinder and cooperating piston, and cooperating check valves, which will insure a highly efficient one-way flow of lubricant to the shaft.

A further object of the invention is to provide a bearing employing the storage tank for providing adequate storage means for oil so that a full supply of oil will at all times be available for lubricating the bearings in a highly efficient manner, thus eliminating the need for frequent stoppage of the machine for lubricating purposes.

A further object of the invention is to provide a bearing of this nature having a filtering screen which will insure that clean oil will be pumped by the piston to flow about the shaft.

A further object of the invention is to provide a bearing which will be characterized by the utmost simplicity and which will be highly efficient in operation.

Other and incidental objects of the invention, not heretofore mentioned, will become apparent during the course of the following description.

My invention is illustrated in the accompanying drawings, wherein:

Figure 1 is a transverse sectional view on the section line 1—1 of Figure 2 looking in the direction indicated by the arrows, Figure 2 is a longitudinal horizontal sectional view on the line 2—2 of Figure 1, Figure 3 is a horizontal sectional view on the line 3—3 of Figure 1, and Figure 4 is a fragmentary plan view showing particularly a portion of the filtering screen employed.

Referring now more particularly to the drawings, wherein similar reference numerals will be seen to designate like parts throughout the various views, the numerals 1 and 2 indicate cooperating upper and lower bearing sections. The bearing section 1 is, of course, of semi-circular shape and is formed of cast metal. In top plan, the bearing section would be rectangular in shape. The bearing section 2 is formed like the section 1, but is formed with a cylinder block 3 at one side thereof. The cylinder block 3 is formed, as best seen in Figures 1 and 2, with a longitudinally extending cylinder 4. The cylinder 4 is closed at one end by a wall 5, at the end of the cylinder block, and at the other end thereof with a removable wall 6. The removable wall 6 is screwed into the end of the cylinder, and said removable wall is formed with an aperture 7 for receiving a piston rod 8 which carries a piston 9 at its inner end. The piston 9 is, of course, movable in the cylinder 4. A guide 10 is formed on the wall 6 and said guide is substantially tubular in contour. The guide 10 is formed with a slot 11 which receives therethrough an actuating finger 12 which is connected with the outer end of the piston rod 8. The finger 12 is slightly laterally turned to define an actuating portion 13.

The arcuate portions of the bearing sections 1 and 2 are indicated at 14 and 15. Said arcuate portions carry bearing sleeve sections 16 and 17 which are preferably formed of babbitt or other soft metal. The bearing sleeve sections are formed with spirally arranged oil grooves or troughs 18 and 19. The troughs 18 and 19, as best seen in Figures 1, 2 and 3, are spirally arranged to extend in opposite directions from opposite ends of the bearing sections. That is to say, the groove 18 extends from the rear end of the bearing about the sleeve to the forward end thereof at the opposite side of said bearing, while the groove 19 extends from the forward end of the lower bearing sleeve section about said lower bearing sleeve section to the rear end of said bearing sleeve section at the opposite side thereof. It will be seen that oil flowing in the grooves or troughs will flow entirely about a shaft rotating in the bearing.

The cylinder 4 has ports 20 and 21 at its opposite ends which connect said cylinder, respectively, with the grooves 18 and 19. The ports 20 and 21 have check valves 22 and 23 therein. The check valves shown are of the spring-pressed ball type, but it should be understood that any desired type of valve may be employed.

In order to provide means for containing oil, to be forced through the grooves, I provide a housing which is shown generally at 24. The housing 24 is preferably formed of sheet metal and is of substantially rectangular contour. Said housing extends completely about the bearing and is provided with a reservoir portion 25 which is disposed above said bearing. The housing 24 is secured to the bearing sections by means of screws 26 and by other means presently to be described. Tie bolts 27, preferably three in number, extend through the bearing sections and through the bottom wall of the housing. The bearing sections are held in proper operative position by the tie bolts 27 and said tie bolts also serve the purpose of anchoring the housing to the bearing sections. The tie bolts 27 are, of course, threaded at their lower ends, and said threaded lower end portions have hexagonal nuts 28 screwed thereon. Spacing sleeves 29 and 30 provide means for properly spacing the bottom wall of the housing from the lower bearing section so that tightening of the nuts 28 will not bend the housing.

Mounted in the reservoir portion 25 of the housing 24 is a foraminous screen 31. The screen 31 is formed with a flange 32 which is upwardly directed and which lies against the inner face of the side wall of the housing 24. Screws 33, which are screwed into the heads of the tie bolts 27, which heads are counterbored and threaded for the purpose, serve to anchor the screen 31 in proper position within the housing and at the bottom of the reservoir thereof. The screen 31 will provide filtering means for the oil in the reservoir. The cylinder block 3 is formed with an upwardly directed bore which communicates with the cylinder and with the interior of the reservoir below the screen to define an oil intake port 34. Exhaust pipes 35 lead from the ends of the grooves remote from the ports 20 and 21. Said pipes 35 extend upwardly through the screen 31 into the reservoir 25.

A shaft 36 is normally mounted to rotate in the bearing. The shaft 36 extends through the bearing between the bearing sections thereof. Said shaft is provided with an annular collar 37 and an externally threaded portion 38 which has a key 39 therein. It should be understood that the shaft 36 may be merely an extension of a mower drive shaft or the like or a shaft of any other machine. At its opposite end the shaft 36 is provided with a cam sleeve 40 which is formed with an annular spirally or eccentrically arranged slot 41 which receives the portion 13 of the finger 12. A locking bolt 42 holds the cam sleeve 40 in place on the shaft 36. As will be seen in Figure 2, the cam sleeve and its associated mechanism is completely enclosed by the housing 24. At the opposite end of the shaft and between the collar 37 and a gasket container 42ª is a preferably felt washer 43. The gasket container 42ª is welded or otherwise suitably secured to the housing. The washer 43 serves the purpose of preventing escape of oil from about the shaft 36.

Connected to the bearing at one side thereof and bolted to the cylinder block 3 is a connecting block 44. The connecting block has countersunk sockets 45 and 46 at its upper and lower sides for providing means for a normal connection with a mower pitman mechanism. The connecting block 44 is removably secured to the cylinder block by means of bolts 47. It should be understood that, if desired, the connecting block may be dispensed with, it depending entirely upon the machine with which the bearing is used.

In order to close the housing 24 at its upper side, a cover 48 is provided. The cover 48 is held in place by a wing nut 49 which is screwed on a rod 50 which rod extends upwardly through the housing and has its lower end anchored in the bearing section 1 medially of the bowed portions thereof. A gasket 51 is fitted between the cover 48 and the upper edge of the housing 24 and said gasket prevents escape of oil.

Although the operation of the invention would appear clear from the foregoing description, it is believed that a short discussion will not be out of place. The bearing is first mounted in the desired position for operation. It should be emphasized that the bearing may be used with any type of machine requiring force feed lubrication for its bearings. The cover 48 is removed and the housing 24 is filled with oil of a desired viscosity. The oil will flow through the screen 31 and through the intake port 34 into the cylinder 4 at both sides of the piston 9. When the shaft 36 is rotated, the cam sleeve 40 will be rotated and the portion 13 of the finger will be caused to follow in the groove or slot 41. As the portion 13 moves in this slot 41, the finger 12, with the piston rod 8, will be reciprocated in the cylinder. Oil in the cylinder at both sides of the piston will be forced under pressure through the check valves 22 and 23 into the grooves 18 and 19. Said oil will flow through said grooves and will lubricate the shaft 36. It will be understood that the oil will be prevented, by the check valves 22 and 23, from flowing back into the cylinder. Said oil will be forced by the pressure created by the moving of the piston in the cylinder through the grooves, as heretofore stated, and outwardly through the pipes 35. The pipes 35 terminate at their upper ends above the screen 31 so that the oil will be filtered before it flows again into the cylinder through the port 34. It is desired to state that the grooves 18 and 19 may be of any desired shape or depth. A typical arrangement which has been found successful is to have the grooves of such depth and shape that the piston 9 will pump a one-half inch column of oil three-sixteenths inch in diameter at each revolution of the shaft. This has been found to effect a complete change of oil about the shaft 36 at every third revolution of said shaft. The washer 43 will effectually prevent escape of oil from about the shaft. When it is desired to change the oil, suitable draining means may be provided in the housing for effecting the draining of used oil. A valve, such as is shown at 52, will be suitable.

The bearing as described thus far renders itself particularly for use at the end of a shaft. However, if desired, as shown in dotted lines in Figure 2, the bearing may be used in the mid portion of the shaft or anywhere therealong. In order to use the device in this manner, the shaft will extend through the housing to a desired position. An additional felt washer 43 will surround the extended shaft to prevent leakage of oil along said shaft. The operation of the invention will be identical.

It is believed that the construction and operation of my improved bearing will now be clearly understood.

Having thus described the invention, what is claimed as new is:

1. In a device of the class described, bearing sections, bearing sleeve sections in said bearing sections and having spirally arranged grooves, one of said bearing sections having a cylinder block formed with a cylinder, a piston in the cylinder, said cylinder having an inlet port leading therefrom and extending through the block, ports leading from the opposite ends of the cylinder to corresponding ends of the grooves, check valves in the ports, a shaft rotatable between the bearing sleeve sections, a drive sleeve secured to the shaft and having a slot, a piston in the cylinder and having a piston rod and a finger provided with a portion engaging in the slot in the driving sleeve, a housing surrounding the bearing sections and cylinder block and adapted for containing lubricant to flow through the first-mentioned port into the cylinder, said piston forcing the lubricant through the second-mentioned ports and check valves through the grooves for lubricating the shaft upon rotation of said shaft and the driving sleeve, and means closing the housing at its upper end.

2. In a device of the class described as recited in claim 1, wherein pipes are employed at the corresponding opposite ends of the grooves for leading oil from said grooves to the interior of the housing.

3. In a device of the class described, upper and lower bearing sections, soft metal bearing sleeve sections carried by the upper and lower portions to define a circular bearing surface, said bearing sleeve sections having spirally arranged grooves, one of said bearing sections having a cylinder block formed with a cylinder, ports leading from the cylinder and communicating with the grooves, a piston in the cylinder and having a piston rod and a finger, said finger having an actuating portion, a shaft rotatable between the bearing sections and sleeve sections, a driving sleeve carried by the shaft and having a slot receiving the actuating portion of the finger, a housing surrounding the bearing section and cylinder block and being adapted to receive lubricant, an inlet port leading from the cylinder to the interior of the housing, and filtering means carried by the housing, said piston being movable by rotation of the shaft and driving sleeve for forcing lubricant through the grooves for lubricating the shaft.

4. In a device of the character described, upper and lower bearing sections, bearing sleeve sections carried by the first-mentioned sections and having spirally arranged grooves, one of said bearing sections having a cylinder, ports communicating between the cylinder and the bearing sleeve sections, an inlet port communicating with the cylinder and opening exteriorly of the cylinder block, outlet pipes carried by the upper bearing section and leading from the opposite ends of the grooves to a point above the upper bearing section, a housing surrounding the bearing sections and the cylinder block for containing lubricant, a filtering screen carried by the housing, means securing the bearing sections to each other, said last-mentioned means partially securing the housing to the bearing section, means for securing the filtering screen to the securing means for the sections, a cover for the housing, and means for securing the cover upon the housing, a piston in the cylinder, a shaft in the bearing, and means connecting the piston with the shaft so that rotation of the shaft will effect reciprocation of the piston in the cylinder for forcing lubricant through the ports and grooves for lubricating the shaft, said lubricant being forced out of the outlet pipes to a point above the filtering screen whereby the oil will be filtered before again passing into the cylinder.

5. In a device of the class described as recited in claim 4, wherein check valves are employed in the ports for insuring one way movement of lubricant from the cylinder.

6. In a device of the class described as recited in claim 4, including a collar about the shaft, a gasket container secured to the housing, and a gasket of relatively soft material disposed between the gasket container and collar for preventing escape of lubricant from about the shaft.

7. In a device of the class described, upper and lower bearing sections, means securing the bearing sections to each other, a housing surrounding the bearing sections, said means securing the housing to said bearing sections, one of said bearing sections having a cylinder, bearing sleeve sections carried by the bearing sections and having diagonally extending spirally arranged grooves, ports extending between the ends of the cylinder and the grooves, a piston in the cylinder, a main piston rod, an end wall closing the cylinder and having a guide for said piston rod, said guide having a slot, a finger carried by the piston rod and extending through the slot and having an actuating portion, a shaft rotatable in the bearing and having a driving sleeve provided with a slot receiving the actuating portion, means locking the driving sleeve on the shaft, and means carried at the opposite end of the shaft for preventing escape of lubricant from about the shaft, said piston being shiftable within the cylinder upon rotation of the shaft for forcing lubricant to flow through the ports and the grooves about the shaft for lubricating said shaft.

8. A bearing for journaling a shaft including sections, said bearing having a cylinder formed therein and said cylinder having a port at each end communicating with the inner surface of the bearing, an intake port communicating between the cylinder and a source of lubricant, a piston in the cylinder, and means for operatively connecting the shaft with the piston whereby reciprocatory movement will be imparted to said piston for discharging lubricant from the first-mentioned ports between the sections and the shaft at each stroke of the piston.

9. A bearing as recited in claim 8 including check valves mounted in the first-mentioned ports.

WILLIAM D. TURNER.